United States Patent [19]

Kunert

[11] Patent Number: 4,555,434

[45] Date of Patent: Nov. 26, 1985

[54] ANTI-GLARE GLASS PANE FOR A VEHICLE

[75] Inventor: Heinz Kunert, Cologne, Fed. Rep. of Germany

[73] Assignee: Saint-Gobain Vitrage, Aubervilliers, France

[21] Appl. No.: 537,673

[22] Filed: Sep. 30, 1983

Related U.S. Application Data

[63] Continuation-in-part of Ser. No. 149,983, May 15, 1980, abandoned.

[30] Foreign Application Priority Data

May 19, 1979 [DE] Fed. Rep. of Germany ....... 2920363
Sep. 5, 1979 [DE] Fed. Rep. of Germany ....... 2935822

[51] Int. Cl.⁴ .................... B32B 3/02; B32B 17/10; H05B 3/10
[52] U.S. Cl. .................................. 428/194; 219/547; 219/552; 428/195; 428/212; 428/218; 428/426; 428/432; 428/433; 428/434; 428/437
[58] Field of Search .............. 428/437, 192, 212, 218, 428/194, 195, 433, 434, 432, 426; 219/347, 552

[56] References Cited

U.S. PATENT DOCUMENTS

| 1,577,527 | 8/1924 | Hoyt. | |
|---|---|---|---|
| 3,293,343 | 12/1966 | Mattimoe. | |
| 3,429,006 | 2/1969 | Mattimoe. | |
| 3,591,406 | 7/1971 | Moynihan | 428/437 |
| 3,868,286 | 2/1975 | Fariss | 428/437 |
| 3,903,396 | 9/1975 | Boaz | 428/437 |
| 3,922,456 | 11/1975 | Baldridge | 428/437 |
| 3,973,058 | 8/1976 | Grover | 428/437 |

FOREIGN PATENT DOCUMENTS

| 0633745 | 5/1963 | Belgium. |
| 852293 | 8/1952 | Fed. Rep. of Germany. |
| 753546 | 11/1923 | France. |
| 1118812 | 6/1956 | France. |
| 2238164 | 2/1975 | France. |
| 2399331 | 3/1979 | France. |
| 729734 | 5/1955 | United Kingdom. |
| 749181 | 5/1956 | United Kingdom. |
| 1002024 | 8/1965 | United Kingdom. |

Primary Examiner—Ellis P. Robinson
Attorney, Agent, or Firm—Pennie & Edmonds

[57] ABSTRACT

Anti-glare glass pane for a vehicle where the pane has a main area of a field of vision and a secondary area of a field of vision located below the main area which is less transparent to the visible spectrum than said main area.

9 Claims, 6 Drawing Figures

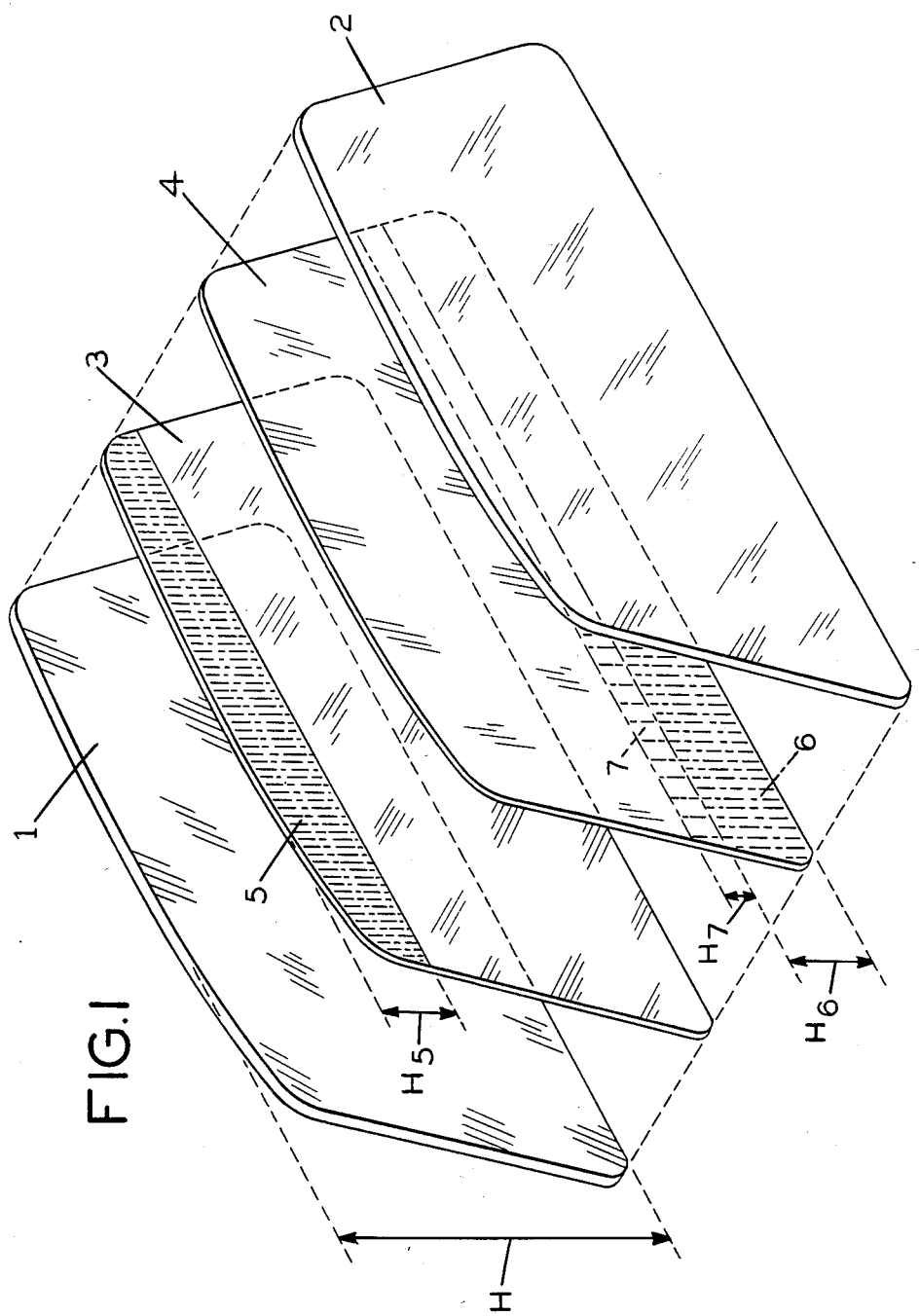

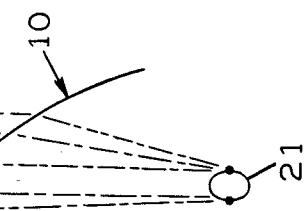
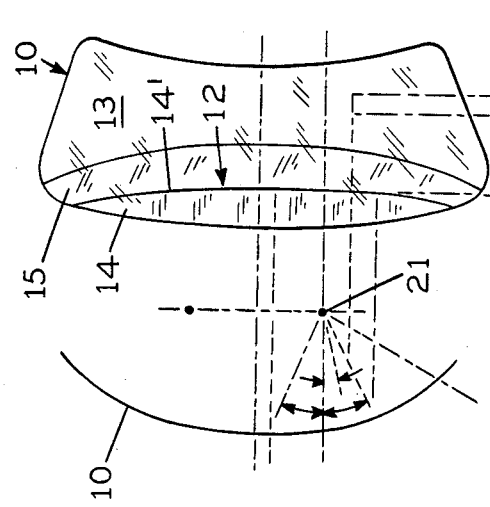
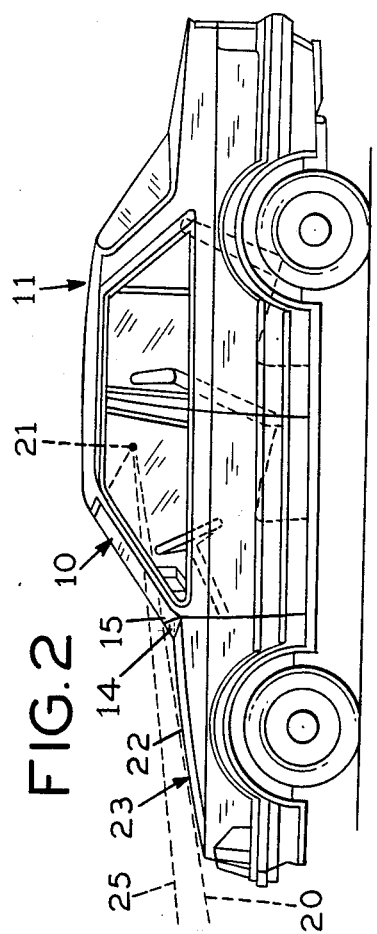
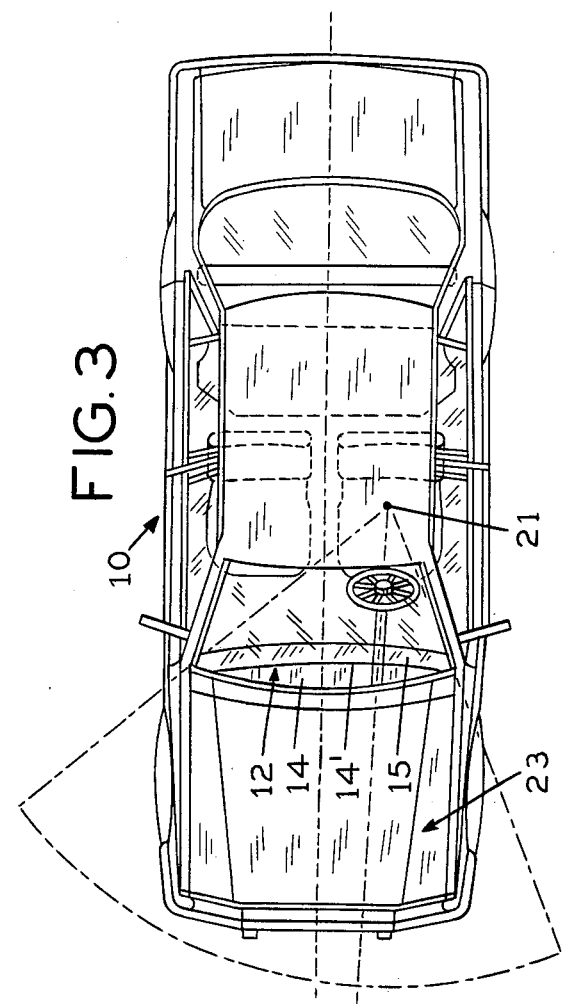

ANTI-GLARE GLASS PANE FOR A VEHICLE

CROSS-REFERENCE TO OTHER APPLICATIONS

This application is a continuation-in-part of my copending application Ser. No. 149,983, filed May 15, 1980 now abandoned.

TECHNICAL FIELD

The invention relates to a glass pane for motor vehicles, especially a windshield, which has areas of decreased transmission of the visible spectrum outside of the area of the main field of vision.

BACKGROUND OF THE INVENTION

Windshields for motor vehicles have been known which have a decreased transmission of the visible spectrum in the upper area of the windshield to serve as a protection against the direct dazzling of the driver by incident sun rays from above and at the same time as a protection against heat. In the case of laminated glass panes, this area of reduced transmission customarily is achieved by the use of thermoplastic intermediate layers having homogenously or continuously dyed strips to form a band-pass filter.

Beside the direct dazzling of the driver during the day caused by incident light of the sun low on the horizon or at night by headlights of oncoming vehicles, the vision of the driver may also be impaired by indirect dazzling. Hitherto, little consideration has been given to the significance of indirect dazzling as brought about, for example, by the reflecting and light scattering surfaces of the roadway directly in front of the vehicle, by the hood of the vehicle or by a light scattering windshield. No effective arrangements are known which are suitable to intentionally decrease the disturbing factors caused by indirect dazzling.

Light striking a transparent pane, for example, a windshild, does not always pass through at the angle of refraction or at the angle of reflection, since some deviation of the direction of light can be expected to occur as a result of light scatter and through diffraction of light. The windshield of a vehicle may be considered as an illuminated light scattering body which, especially at night, leads to impediments of sight as a result of haze glare. Haze glare not only occurs in the case of strongly acting windshields, as is well known, by direct incident light, but as experiments have shown, also by the light of a vehicle's own dimmed headlights reflecting from the roadway and by the light of the street illumination reflected on the hood of the vehicle.

For the visibility of an object, the relative difference of luminance between the object and the outer field (photometric contrast) is decisive. In this case, the following formula is valid:

$$K = \frac{B_u - B_o}{B_u + B_o}$$

$K$ = photometric contrast
$B_u$ = outer field luminance
$B_o$ = object luminance The haze luminance of a scattering transparent pane is superposed both on the value $B_u$ as well as on the value $B_o$ in the case of haze and fog dazzle. In that case, the following is valid:

$$K_s = \frac{B_u - B_o}{B_u + B_o + 2 B_s}$$

$B_s$ = dazzle luminance of the scattering pane $K_s$ in this case always assumes smaller values than K. The capacity of the eye to discern differences in luminance in the case of a certain illumination level requires a minimum value of K. K is proportional to the distance of vision. $K > K_s$ always signifies a decrease of the distance of vision.

In the practical operation of a vehicle, windshields always have some surface roughening, scratches and nicks which act as light scattering centers. In the same manner scattered light is caused by dust particles, dirt and coatings of moisture on the surface of the pane. The glass material itself, and in the case of windshields made from laminated glass panes, the layers of plastic between the panes are each considered as not being optically empty. Portions of scattered light of about 0.4% have been measured in panes and in laminated panes because of contamination of the glass or plastic layers or due to inclusion of small foreign bodies in the glass panes or plastic layers.

A number of tests have been made which led to the result that a high correlation exists between the length of use of a windshield and its scatter light factor. With increasing length of use, the amount of the surface damage of the panes caused by the abrasion process due to the action of the windshield wipers increases. Also the surface of the panes become pitted as a consequence of being struck by stones. In the case of windshields with operational distances of 100,000 km, scatter light values of 2 to 4% have been measured. Dusty or dirty windshields or windshields coated on the inside with nicotine or softener condensates may cause additional values at the same order of magnitude. In the case of moisture condensations on the inside or in the case of a water film on the outside of a windshield, values of scattered light up to 15% have been measured.

A light scattering windshield acts in effect as a source of light or as an illuminated pane which reflects diffuse light. The dazzle effect developed depends on the intensity of the stream of light striking the pane, on the manner and the dimension of the scattering media, and likewise on the size of the surface of the pane.

For the haze glare viewpoint of the driver, the light of his own vehicle's headlights, and the street illumination reflected by the roadway and the hood of his car are all of significance and a cause of indirect light striking a light scattering windshield.

The level of illumination occurring in the area close to the vehicle, and especially when halogen lights are used to provide the illumination, causes an intensive reflection. This is particularly true in the case of a strongly reflecting surface of a roadway where the reflection may be considered as a cause for the formation of haze luminance, not only in connection with light scattering windshields, but generally may represent a direct cause for relative dazzle or adaption dazzle and even absolute dazzle depending on the strength of the reflection.

It is therefore an object of the invention to provide for an anti-glare pane for a vehicle which will reduce haze glare and also reduce indirect glare or relative glare caused by light penetrating the parts of the pane outside of the main field of vision and especially light reflected from the hood and the roadway in the area close to the vehicle.

DESCRIPTION OF THE INVENTION

Generally an anti-glare glass pane utilized as a windshield constructed according to my invention has areas with decreased transmission in the visible spectrum below a main area of the pane corresponding to the main field of vision.

The main area of the pane corresponding to the main field of vision should have a transmission of light as high as possible in the visible spectrum, whereas in the areas or outside of the main field of vision, an increased absorption of the visible spectrum should take place. In this manner there will be a partial reduction of the haze luminance above the surface of the windshield as well as a dampening of the light rays striking the pane outside of the main field of vision such that any dazzle effect is reduced.

Introduction of a light transmission reducing filter in the areas of the pane outside of the area of the main field of vision will result in a lowering of the haze luminance in the middle area of the pane and also will result in a direct decrease of light irradiation reflected from the illuminated roadway in close vicinity to the vehicle and from the hood of the vehicle. Haze luminance and light irradiation caused by reflection reduces the capacity of vision in the central area of the pane because any increase of the strength of illumination on the retina of the eye of the vehicle operator results in scattered light produced in the apparatus of the eye. The latter results in reduced vision especially in the case of older individuals, whose eye lenses may have a high scatter factor for incident rays of light because of opacities.

The operation of an anti-glare pane constructed according to the invention in view of the haze glare effect may be explained as follows. In every illuminated transparent pane, reflections of light rays occur at the inside surfaces of the body of the pane from rays passing through the denser medium glass and which strike the inside surfaces below the angle for total reflection. The reflected light rays are again reflected always at the opposite side so that they are transmitted continuously in the pane. A glass pane is practically a flat light conductor for such light rays. As a result of the light conductive effect of a glass pane, the sum of all light rays over the entire surface, which enter into the body of glass lead to multiple reflections on the inside of the surface and is an influencing value in producing haze luminance because at centers of scatter, light rays may penetrate into the body of the pane as well as emerge at variable distances from other centers of scatter.

Rays which enter in the marginal areas of a pane may emerge only inconsiderably weakened in the area of the main field of vision in consequence of the high transparency of the body of the pane in the area of the main field. Whenever on the other hand these marginal areas have a higher optical density, that is to say, an increased absorption, then the intensity of these light rays entering into the body of the pane are weakened in their intensity corresponding to this increased absorption. For example, even after a two-time reflection in a 5 mm thick glass pane which has a degree of light absorption of 30%, a light ray in the area of the marginal area will lose about 60% of its intensity as compared to an intensity loss of about 9% in the case of an area in a glass pane with an unweakened transparency. Therefore, an increased absorption in the areas of the pane outside of the main area corresponding to the main field of vision of the driver will result in a reduction of haze luminance in the main field of vision.

Generally viewed, an important factor in reducing deterioration of vision in consequence of dazzle is to reduce the dazzling surfaces of a pane by creation of a narrower field of vision, or to reduce the intensity of illumination.

In a further development of the invention, it is proposed to provide a pane used as a windshield with a band filter at the lower edge of the pane, that is to say below the main area of the main field of vision as of the type which has been used in the upper area of a windshield and which may comprise an undyed or slightly dyed area in parallel to the lower edge of the pane. Such a band filter in the lower area of a windshield should be developed preferably as a dye-wedge, i.e., it should have increasing light transmission properties in the direction of the main area of the main field of vision up to the transmission properties of the main field of vision which would be transparent to wave lengths of about 500–550 $\mu$m.

In arriving at the light transmission gradient (change of light transmission) of the lower area of the windshield extending upwardly towards the main area of vision, it is important that the light transmission increase evenly upwardly from the bottom of the lower area towards the main area of the main field of vision. The eye of the vehicle operator must not perceive this transition as discontinuous or as a horizontally oriented contour. It is known that in the case of horizontally running contours on transparent panes through which an orientation is achieved, irritation of sight can occur in such a way that such contours are fixed by the eye and distract from the objects being viewed at a distance. In addition, it is known from physiological optical studies, that even when using both eyes, that the distance from the horizontally running contours or lines on a pane, compared to vertically running contours, cannot be reliably estimated or perceived. Horizontally running contours on glass panes are projected, particularly in the case of night vision, whenever nearby reference points are missing, onto objects lying at a distance, or are assigned to objects viewed with greater attention.

The band filter on the pane forms a secondary area the level of which depends on the main area of the pane corresponding to the main field of vision from the vehicle. This band filter preferably should have a relatively high density corresponding to a light transmission of the visible spectrum of between 30 to 50% in the case of perpendicular incident light which extends from the bottom of the pane up to a level which is limited by the line of sight which is tangent to the upper edge of the hood of the vehicle and which forms a lower portion of the secondary area. This secondary area of vision of the windshield is without significance to the operator in view of his traffic orientation. The density of the secondary area inhibiting transmission of light should decrease gradually up to a level of the pane which is limited by a line of sight which meets the roadbed at a distance of 10 to 20 m in front of the vehicle. In this upper portion of the secondary area, gradually increasing light transmission of 50 to 70% can be realized with the assurance that the point of perception of the driver always lies on the roadbed at the distance of 10 to 20 m. In the case of driving at night, this distance of 10 to 20 m is illuminated so intensively by the dimmed and by the distance headlights, that from a point of view of the level of illumination, even in the case of intentional use of the above-mentioned filter sizes, the condition for a good photometric contrast exists.

The driver of a motor vehicle in case of night travel is inclined to direct his vision unconsciously onto the spot of greatest brightness, namely at an area in front of the vehicle up to the above-mentioned distance of 10 to 20 m. However, it is here that the greatest danger of a glare exists, as a result of intensive light reflection of ones own headlights from the surface of the roadbed. Moreover, a fixation of the view at this distance for night driving operation is not optimal. A filter band which covers this area up to a distance of 10 to 20 m in front of the vehicle therefore also has the considerable advantage of inducing the driver to direct his vision always to the extension of the distance of 20 to 50 m in front of the vehicle which is the more important one for driving operation. The place of driven orientation will not therefore be fixed on the area of the greater brightness as a result of the proposed filter band.

In order to prevent the image of the road appearing in an unnatural color, the area of the filter through which the driver views the road image should preferably be developed in a neutral gray color.

Use of a filter band in the lower area of a windshield pane particularly protects the lower area of the sensitive retina parts of the operator. A pane partially equipped in the lower area with a band of high optical density has even more advantages. First of all, a higher average density of the entire surface of the pane will result and the bleaching out of the visual purple of the spectrum in the case of bright sunlight is counteracted over the entire windshield by the higher average density resulting therefrom. As a result of an excessive bleaching out of the visual purple by too high luminance, the night vision of the operator may be severely disturbed. In countries with a sunny and dry climate and a quick sequence of daylight and darkness without any long lasting twilight phase, this circumstance may lead to a considerable impediment of vision for the driver of a vehicle in the first hours of darkness because of the short regeneration times.

Beside the advantageous effect of the invention with regard to indirect glare, direct glare is also further decreased. Optical performances of vision are possible only in a relatively narrow luminance area of about 200 to 10,000 asb, since the Weber-Fechner law has validity practically only in this area. According to measurements of light technicians, field of vision luminances between 50,000 and 100,00 asb may occur on summer days when watching strongly reflecting streets and metal surfaces. Direct or absolute glare does not only lead to a reduction of the capacity of vision but also gives rise to painful glare sensations and to functional impediments of the apparatus of the eye as a result of a constant reflectory compensation.

In a further form of the invention, the light absorption according to the invention may be carried out with means which at the same time absorb or reflect heat rays. In this manner, one may achieve heat dampening values which are of importance in panes used as windshields. An infra-red heat absorbing or reflecting filter band in the lower area of the pane may likewise diminish partial heating up of the dashboard which is unpleasant for the driver and heating up of forward operating installations.

It is especially advantageous to have the filter band comprising the secondary area at the lower part of the pane to have the properties of a neutral gray filter. A further area of the pane located above the main area corresponding to the main field of vision may comprise the conventional green or bronze color. The driver may thus look through the secondary area without color distortions while the further area will have the best properties of heat absorption.

The diminishment of the light transmission according to the invention may also be achieved among other things by surface coating layers which, as such, are electrically conductive with the layers being connected to current supply rails. Such coatings are known in many variations. In such a case, it is possible to use the layers as heating resistances which are connected to a power supply and which may achieve a sufficient heating capacity in order to prevent any fogging in the main area corresponding to the main field of vision. This results in an additional improvement in relation to the optical quality of the windshield since a hardly noticeable film of moisture on the inside of a windshield will produce considerable phenomena of scattered light. The elimination of the film of moisture by way of a hot air blower on the other hand as a rule leads to the pane being covered with dust or to a contamination of the surface of the pane increasing formation of haze luminances in the main field of vision of the driver.

The coatings may comprise printed on or steamed on layers or metal coatings vaporized on a pane. Such layers can be applied directly to the surface of the pane or instead a specific plastic foil may be inserted between two PVB foils. Also the combination of both principles is possible depending on the use of the concept of a light filter with the concept of the additional heat reflection or absorption.

In the case of panes comprising laminated glass plates as used today, the lower secondary area of the plate having the increased absorption of light rays may be achieved by way of a gradual dyeing of a thermoplastic intermediate layer of a polyvinyl butyral or some other suitable plastic which is inserted between the glass plates. At the same time, the intermediate layer consists of two foils, one foil of which forms the lower secondary area with the decreased light transmission and the other foil which forms the further upper area with the decreased light transmission.

In this manner a laminated glass pane having a lower secondary area and an upper further area decreased light transmissions may be produced utilizing two transparent foils which form the plastic layer which has an area with decreased transmission along a longitudinal side. The two foils are placed one on top of the other in such a way that the main area of the pane corresponding to the main field of vision is dimensioned according to the size of the glass pane and to the dimensions of the vehicle and is further disposed between the two areas of decreased light transmission. In this way, it becomes possible to produce panes of diverse dimensions for all types of motor vehicles using a single web of foil when the pane is to have lower light transmissions in the lower part of the pane or to use only two different webs of foils when the pane has lower light transmissions in the upper and lower parts of the plane.

This embodiment of the invention may be realized for example in such a way that instead of a 0.76 mm thick polyvinyl butyral foil, as used customarily in laminated windshields, two polyvinyl butyral foils each of a thickness of 0.38 mm are used each of which is dyed along one longitudinal side over a width of about 20 cm.

These dyed areas may be developed in a known manner as a dye wedge with a dye density decreasing toward the non-dyed side of the foil. Two foils of this type which otherwise may be developed identically and may be cut from the same web or foil are placed one on top of the other corresponding to the dimensions of the pane in such a way that the areas of transition between the main field of vision and the dyed fields will be located at the desired places within the pane.

BRIEF DESCRIPTION OF THE DRAWINGS

FIG. 1 represents an exploded view of an anti-glare glass pane constructed according to the invention;

FIG. 2 is a diagrammatic side view of a vehicle having an anti-glare glass pane constructed according to the invention;

FIG. 3 is a broken plan view of the vehicle of FIG. 1;

FIG. 4A is a front view of an anti-glare glass pane as used in a vehicle;

FIG. 4B is a plan view of the pane of FIG. 4A, and;

FIG. 4C is a side view of the pane of FIG. 4A.

DESCRIPTION OF PREFERRED EMBODIMENTS OF THE INVENTION

Preferred embodiments of the invention are set forth in the following Examples.

EXAMPLE 1

A pane is divided in the vertical direction into three areas extending in a horizontal direction with variable degrees of transmission, namely a main area corresponding to the main field of vision, a lower secondary area below the main area having a band filter and an upper further area having a band filter. The vertical extent of the upper area further comprises 20 to 30% of the total height of the pane and preferably amounts to 25% of the height of the pane and the degree of light transmission in this area amounts to 10% in the median. At the same time, the transmission in this area may increase running from the top of the pane to the bottom. The vertical extent of the main area comprises 30 to 40% of the total height of the pane and preferably amounts to 35% of the height of the pane and the degree of light transmission in this area is homogeneously 85%. The vertical extent of the lower secondary area comprises 35 to 45% of the total height of the pane and preferably corresponds to 40% of the height of the pane and the light transmission in this area amounts to 40% in the median. This band filter in the secondary area also has a progressively varying density whereby the transmission becoming higher in the direction towards the main area. Viewed over the entire pane, the light transmission amounts to about 48% in the median.

EXAMPLE 2

A pane is produced which has four band-shaped areas extending in the horizontal direction each having variable degrees of transmission, whereby the density of the band areas change continuously such that the density of adjacent areas blend one into the other.

The lowest band area covers the view of the hood or of the foremost parts of the car body and corresponds to the lower portion of a secondary area of the pane. This lower portion extends up to a height of the pane which is limited by a line of sight extending from the operator of a vehicle to a point on the upper edge of the hood. In this portion the pane has a transmission of 40% in the median, whereby the transmission increases continuously from bottom to top.

An area of the band follows the lowest band area and covers the area of vision of space near the vehicle and corresponds to an upper portion of the secondary area. On the one hand this area near the vehicle is insignificant as a space of orientation for the operator. On the other hand a level of illumination by the vehicle's headlights is maintained which lies clearly above the photometric contrast. This area of the band extends upwards on the pane to a level which is limited by a line of sight extending from the operator which meets the roadbed at a distance of about 20 m in front of the vehicle. In this upper portion of the secondary area of the pane, the pane has a median transmission of 60%, whereby the transmission increases continuously in an upward direction.

The upper portion of the secondary area is followed by the main area corresponding to the main field of vision in which the height transmission has a high value of about 85%. The upper limit of this main field of vision lies so far above the line of sight of the operator that the latter can still see at a distance of 10 m through the main field of vision lights of traffic signals without color distortion.

Finally, the upper area of the band filter follows the main area to form a further area which has a degree of transmission of about 10% in the median.

EXAMPLE 3

This embodiment is described with reference to the drawing.

A windshield comprises a pane 1 made of 3 mm thick silicate glass, a pane 2 made of 2 mm thick silicate glass and two 0.38 mm thick foils 3 and 4 made of polyvinyl butyral. The foil 3 has an area 5 along its upper edge with a decreased transmission in the order of magnitude of 10%. The height $H_5$ of the area 5 amounts to about 20% of the total height H of the windshield. The foil 3 has a transmission of almost 100% in its remaining portions. The foil 4 has an area 6 along its lower edge with a transmission of about 40% and an area 7 adjacent to it with a transmission of about 60%. The height $H_6$ of the area 6 amounts to about 30% of the height H of the windshield, and the height $H_7$ of the area 7 amounts to about 10% of the height H of the windshield. The individual areas 5, 6 and 7 may be dyed continuously in the sense that their light transmission characteristics increase towards the main field of vision which is located between areas 5 and 7. The individual parts 1, 2, 3 and 4 are interconnected in a known and customary manner to form the laminated pane.

The foils 3 and 4 are cut from broader webs of foil at such places within the web that the border lines between the dyed and the fully transparent areas lie within the finished inserted panes at the optical levels determined by the dimensions of the vehicle and the principal points of vision.

Referring to FIGS. 2, 3, 4A, 4B and 4C, there is illustrated diagrammatically a pane constructed according to the invention installed in a vehicle where a lower portion of a secondary area of the pane is concave shaped and positioned asymmetrically with respect to the pane.

As shown the pane 10 is placed in a vehicle 11 to serve as a windshield. The pane includes a secondary area 12 of lower light transmission than a main area 13. The secondary area 12 is dividied into a lower portion 14 and an upper portion 15 where the lower portion will preferably have a light transmission of the visible spectrum on the order of 30–50% and the upper portion will have a light transmission on the order of 50–70% with the light transmission increasing gradually upwards from the bottom of the secondary area to the top.

Referring to FIG. 3 it is seen that the curved top edge 14' of the lower portion 14 is limited in its height by a line of sight 20 extending from an eye point 21 of a vehicle operator and tangent to the upper edge 22 of a hood 23 on the front of the vehicle. It is apparent that this lower portion 14 of the secondary area does not interfere with the operator's range of vision when observing the roadway in front of the vehicle.

Since, as shown in FIG. 3, the operator sits on one side of the vehicle, his eye point 21 will be asymmetrically positioned with respect to the vehicle and his line of sight with a tangent to the hood will vary from one side of the hood to the other side. The result is that if the upper edge 14' of the lower portion is to be limited by the line of sight along its complete length, the edge 14' will not form an even curve but rather one having a slightly greater degree of curvature on the operator side than the degree of curvature on the opposite side. This is shown in FIG. 4A.

This asymmetric effect is further exaggerated by the curvature of a conventional pane used as a windshield as shown in FIGS. 4B and 4C.

The upper portion 15 of the secondary area is positioned between the line of sight 20 and a further line of sight 25 extending between the eye point 21 and at a point approximately 20 m ahead of the vehicle. The area of the roadway in the field of vision between the lines of sight 20 and 25 covers a distance of about 10–20 m in front of the vehicle which, as explained previously, is a primary source of reflection from the vehicle's headlights. To reduce the dazzle caused by this reflection and in order to assure correct color of objects seen through the upper portion of the secondary areas, the upper portion has the characteristics of a neutral gray filter which may be developed with transparent, not scattering color, preferably as a color mixture of blue/green, yellow and purple of light fastness classes VI–VIII.

I claim:

1. Anti-glare glass pane for a windshield of a vehicle having a front hood where said pane has a main area of a field of vision and a secondary area of a field of vision beneath said main area and which is less transparent than said main area; characterized in that a lower portion of the secondary area is in the shape of a downwardly curved concave band having an upper substantially center portion extending upwardly towards the top of the pane and lower side portions curved downwardly towards the bottom and both sides of the pane, in that the degree of transparency of the secondary area increases gradually from the bottom thereof towards the top, in that said lower portion of the secondary area has light transmission of the visable spectrum in the range of 30 to 50%, in that an upper portion of the secondary area positioned between the bottom portion and the main area of vision has a light transmission of the visible spectrum in the range of 50–80%, and in that said upper portion is positioned along a line of sight adapted to extend from the eye level of the operator of the vehicle to an area of a roadway 10–20 m ahead of the vehicle.

2. Anti-glare glass pane according to claim 1 further characterized in that said upper portion has the characteristics of a neutral gray filter.

3. Anti-glare glass pane according to claim 1 further characterized in that the properties of transparency to the visible spectrum are derived from layers of metal coatings vaporized on the surface of said pane.

4. Anti-glare glass pane according to claim 1 further characterized in that the properties of transparency to the visible spectrum are derived from layers pressed into a part of the pane.

5. Anti-glare glass pane according to claim 1 further characterized in that the properties of transparency to the visible spectrum are derived from layers which are electrically conductive and having in addition current supply rails for the purpose of heating said pane.

6. Anti-glare glass pane according to claim 1 further characterized in that the pane is laminated and in that said secondary area includes a separate plastic foil which is dyed to reduce transmission of the visible spectrum.

7. Anti-glare glass pane for a windshield of a vehicle where said pane has a main area of a field of vision which is more transparent than a lower secondary area of a field of vision, said lower secondary area comprising 35 to 45% of the total height of said pane and formed by an upper and lower portion, said upper portion positioned between the main area and said lower portion along a line of sight adapted to extend from the eye level of an operator of said vehicle, said upper portion having a light transmission in the visible spectrum in the range of 50 to 80%, and said lower portion having a light transmission in the visible spectrum in the range of 30 to 50%, said pane further characterized in that the bottom edge of the main area is curved downwardly substantially from a middle portion thereof towards the lower and side portions of the pane where the side portions of the pane will have a greater transparency than a middle portion of the pane of equal height.

8. Anti-glare glass pane according to claim 1 further characterized in that the upper edge of the lower portion of the secondary area is limited throughout its length by a line of sight extending from the operator and tangent to the upper edges of the front hood.

9. Anti-glare glass pane according to claim 8 wherein said band is asymmetrically positioned with respect to said pane with the curve of the upper edge of the band having a greater degree of curvature on the operator's side of the vehicle than the degree of curvature on the non-operator's side of the vehicle and where the uppermost portion of the band is positioned on the operator's side of the vehicle.

* * * * *